Patented Nov. 6, 1923.

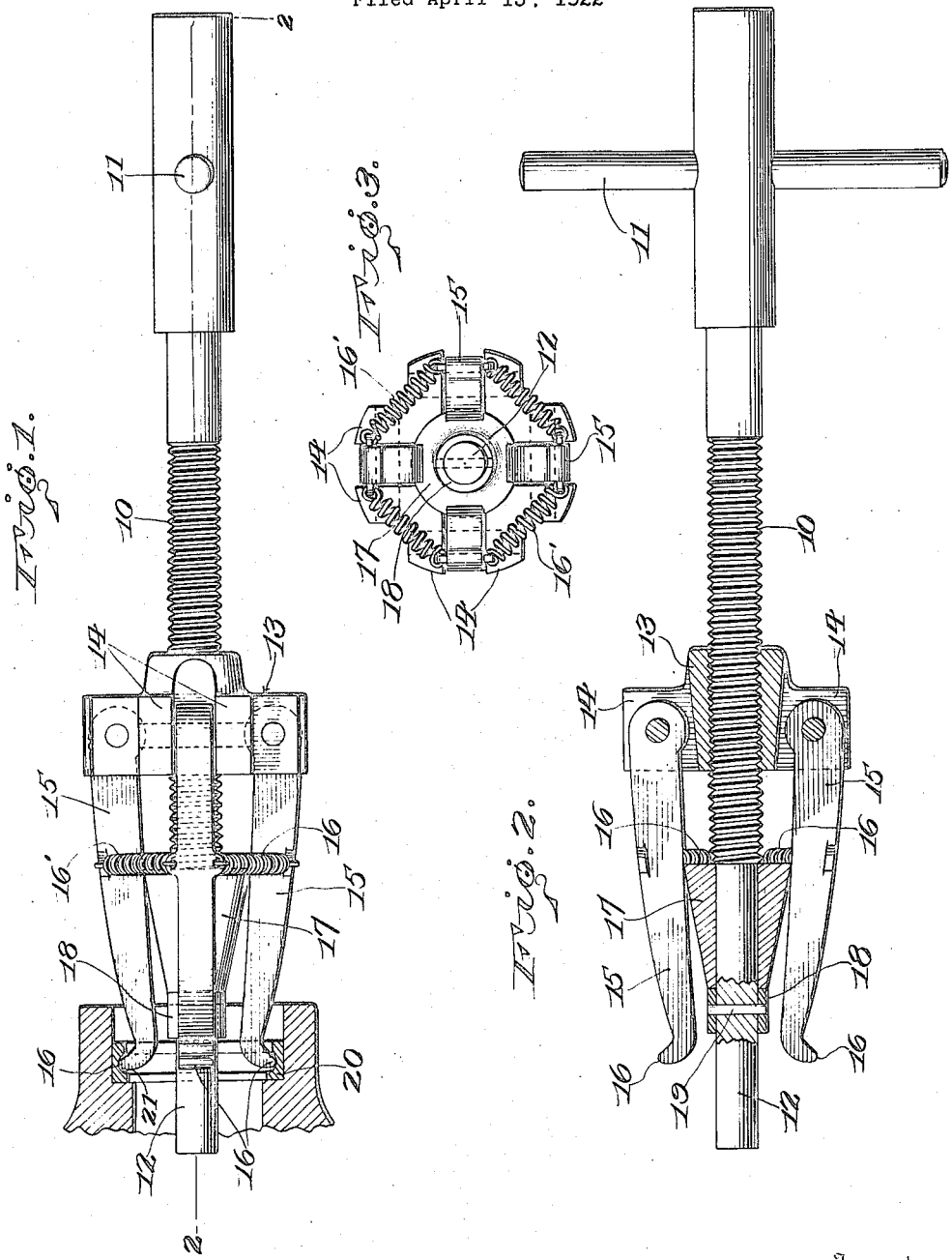

1,473,075

UNITED STATES PATENT OFFICE.

WALTER A. BATES, OF ENID, OKLAHOMA.

BEARING-RACE REMOVER.

Application filed April 15, 1922. Serial No. 553,083.

*To all whom it may concern:*

Be it known that I, WALTER A. BATES, a citizen of the United States, residing at Enid, in the county of Garfield, State of Oklahoma, have invented certain new and useful Improvements in Bearing-Race Removers; and I do hereby declare the following to be a full, clear, and exact description of the invention, such as will enable others skilled in the art to which it appertains to make and use the same.

This invention relates to new and useful improvements in extracting devices and particularly to devices for extracting and placing the outer races of ball bearings of magnetos, generators, and the like.

One object of the invention is to provide a device of this character which is capable of removing or seating outer races of magnetos which are of different diameters, without damaging the seats or shells.

Other objects and advantages will be apparent from the following description when taken in connection with the accompanying drawing.

In the drawing:

Figure 1 is a side elevation of the extractor in operative position when extracting the race.

Figure 2 is a horizontal longitudinal sectional view on the line 2—2 of Figure 1.

Figure 3 is an end view looking into the jaws.

Referring particularly to the accompanying drawing, 10 represents a longitudinally threaded bar having a transverse handle bar 11 at one end, and having its other end slightly reduced in diameter and formed with a smooth exterior, as seen at 12. The bar 11 is threaded through the hub of a block 13, said block having a plurality of pairs of radially extending apertured ears 14. Between each pair of ears 14 there is disposed the inner end of a ball race gripping arm 15, the outer end of which is directed obliquely outwardly and formed with sharpened end portions 16. Connecting each arm 15 with each adjacent arm, at the sides thereof, are the coil springs 16, the same serving to force the arms to swing inwardly, on their pivots, toward the threaded bar 10.

Disposed on the before-mentioned reduced end 12, of the bar 10, is a cone 17, a collar 18 being secured to the said end of the bar, outwardly of the outer end of the cone, by means of a transverse pin 19. The inner end of the cone 17 bears against the outermost of the threads of the bar. Thus, when the bar 10 is rotated it will move through the hub of the block 13, and carry with it the cone 17, so that the inclined face of said cone will bear against the inner faces of the outer ends of the arms 15, and cause said arms to swing toward or away from the bar 10, in accordance with the direction of the rotation of said bar.

When the bar 10 has been rotated in the proper manner to permit the arms to swing inwardly toward the bar 10, the device is inserted within the bearing race ring 20, so that the sharpened ends 16 will enter the groove 21, in the inner face of the ring. The handle bar 11 is then grasped and the bar 10 rotated to cause the cone 17 to move outwardly and swing the arms 15 outwardly, with the result that the said ends 16, of the arm, will bite into the ring, and obtain a firm grip thereon. By tapping on the inner, or reduced end of the bar 10, with a hammer, or like tool, the extractor, and ring will be forced out.

It will be understood that cones of different sizes may be applied to the bar 10, so that race rings of different diameters may be readily extracted with this device.

If desired, the cone may be applied in the reverse manner to that shown in the drawing, so that the bar 10 will be rotated in the opposite direction to cause the outward swinging of the arms 15.

The device is also adapted for use in driving the races into their seats, and this is accomplished by placing the race in the outer end of the seat, or holding the same so that the outer ends of the arms 15 can be spread to grip the interior of the race, after which the race is pushed into the shell of the generator as far as it can be, and a blow of a hammer or mallet applied to the outer end of the bar 10.

What is claimed is:

A bearing race puller including a block having a central internally threaded portion and radiating pairs of apertured arms, bearing race engaging pawls pivotally mounted between the pairs of arms, a screw threaded through the central portion of the said block and having its outer end unthreaded, and a cone-shaped spreading block removably secured on the unthreaded portion of the screw and engaged with the inner faces of the said pawls.

In testimony whereof I affix my signature, in the presence of two witnesses.

WALTER A. BATES.

Witnesses:
M. G. TILLERY,
HARVEY B. HAYES.